United States Patent
Sun (10) Patent No.: US 10,042,896 B2
(45) Date of Patent: Aug. 7, 2018

(54) PROVIDING SEARCH RECOMMENDATION

(71) Applicant: Alibaba Group Holding Limited, Grand Cayman (KY)

(72) Inventor: Changlong Sun, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 439 days.

(21) Appl. No.: 14/663,371

(22) Filed: Mar. 19, 2015

(65) Prior Publication Data

US 2015/0269163 A1    Sep. 24, 2015

(30) Foreign Application Priority Data

Mar. 21, 2014    (CN) .......................... 2014 1 0108614

(51) Int. Cl.
*G06F 17/30* (2006.01)
(52) U.S. Cl.
CPC .............................. *G06F 17/3053* (2013.01)
(58) Field of Classification Search
CPC ..................... G06F 17/3053; G06F 17/30705
USPC ................................................. 707/728, 739
See application file for complete search history.

(56) References Cited

U.S. PATENT DOCUMENTS

| 8,050,998 B2 * | 11/2011 | Bolivar | G06Q 30/02 705/35 |
| 8,799,306 B2 * | 8/2014 | Zhu | G06F 17/3097 707/759 |
| 2008/0281808 A1 | 11/2008 | Anderson et al. | |
| 2009/0276230 A1 | 11/2009 | Smyers et al. | |
| 2011/0035370 A1 | 2/2011 | Ortega et al. | |
| 2011/0258148 A1 | 10/2011 | Gao et al. | |
| 2012/0117006 A1 | 5/2012 | Sathish | |
| 2012/0173562 A1 | 7/2012 | Zhu et al. | |

(Continued)

FOREIGN PATENT DOCUMENTS

| CN | 102368262 | 3/2012 |
| CN | 103064853 | 4/2013 |
| WO | WO2014040169 | 3/2014 |

OTHER PUBLICATIONS

David M. Pennock et al., Social Choice Theory and Recommender Systems:Analysis of the Axiomatic Foundations of Collaborative Filtering, 2000, AM for Artifitial intelligence, pp. 6.*

(Continued)

*Primary Examiner* — Jean B Fleurantin
(74) *Attorney, Agent, or Firm* — Lee & Hayes, PLLC (57) ABSTRACT

A first search term input by a user is obtained. The first search term is matched with at least one keyword in a list such as an offline lists to select at least one keyword from the list. Each keyword in the list corresponds to at least one search recommendation respectively. A search recommendation corresponding to the at least one keyword selected from the offline list is obtained and provided to the user as a search recommendation of the first search term. For example, a historical user behavior relating to the keyword is obtained from a log record. A document generated by the historical user behavior is obtained. At least one candidate recommendations are obtained from text segmentation of the document. The present techniques provide a large range of selection of search recommendations, reduce a number of user searches, and further reduce search time and traffic.

20 Claims, 8 Drawing Sheets

(56) References Cited

U.S. PATENT DOCUMENTS

| | | | |
|---|---|---|---|
| 2013/0006958 A1* | 1/2013 | Cava | G06F 17/3064 |
| | | | 707/711 |
| 2013/0041884 A1 | 2/2013 | Nomula | |
| 2013/0046772 A1 | 2/2013 | Gu et al. | |
| 2013/0170749 A1 | 7/2013 | Tian | |
| 2013/0191409 A1 | 7/2013 | Zeng et al. | |
| 2013/0198030 A1 | 8/2013 | Linden et al. | |
| 2014/0019452 A1 | 1/2014 | He et al. | |
| 2014/0081970 A1 | 3/2014 | Sueyoshi | |
| 2014/0101142 A1 | 4/2014 | Gomez Uribe et al. | |
| 2015/0006290 A1 | 1/2015 | Tomkins et al. | |

OTHER PUBLICATIONS

PCT Search Report and Written Opinion dated Jun. 23, 2015 for PCT Application No. PCT/US15/21601, 10 Pages.

* cited by examiner

PROVIDING SEARCH RECOMMENDATION

CROSS-REFERENCE TO RELATED PATENT APPLICATIONS

This application claims foreign priority to Chinese Patent Application No. 201410108614.1 filed on Mar. 21, 2014 entitled "Method and Apparatus for Providing Search Suggestions," which is hereby incorporated by reference in its entirety.

TECHNICAL FIELD

The present disclosure generally relates to the field of network technology, and, more particularly, to a method and apparatus for providing search recommendations.

BACKGROUND

As a frequently used information search system, a search engine helps users to search information required by the users. For example, when a user inputs a search term "anti-haze mask" at a search page, the search engine may search for a plurality of websites or applications relating to the search term "anti-haze mask".

In order to facilitate the users to perform a search conveniently and efficiently, a plurality of search recommendations relating to the search term may be automatically generated and provided to the users to choose after the users input the search term. At present, generation of a search recommendation is mainly based on a user search history. For example, if the user has searched terms such as "anti-haze mask price," "anti-haze mask model," etc., after the user inputs a term "anti-haze mask," search recommendations such as "anti-haze mask price," "anti-haze mask model," etc. may be provided at a search page through means of a drop-down menu, etc.

However, the conventional method for providing search recommendations based on search history obviously has a narrow selection range of search recommendations. The users often need to search many times, thereby consuming a lot of time and network traffic.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present techniques provide an example method and apparatus for providing a search recommendation and device to solve the technical problem to increase a selection range of search recommendations and reduce a number of user searches, search time, and search traffic consumed by search.

The present disclosure provides an example method for providing search recommendations.

A first search term input by a user is obtained. The first search term is matched with at least one keyword in a list such as an offline lists to select at least one keyword from the offline list. Each keyword in the offline list corresponds to at least one search recommendation respectively.

A search recommendation corresponding to the at least one keyword selected from the offline list is obtained and provided to the user as a search recommendation of the first search term.

For example, the search recommendation corresponding to a keyword in the offline list may be obtained by the following operations.

A historical user behavior relating to the keyword is obtained from a log record. A document generated by the historical user behavior is obtained. At least one candidate recommendations are obtained from text segmentation of the document. The at least one candidate recommendations are filtered according to importance degree characteristics of the candidate recommendations. The candidate recommendations after filtering are used as the search recommendations corresponding to the keyword.

Optionally, before the user obtains the first search term input by the user, the example method may further include the following operations.

A second search term input by the user is obtained. A search recommendation corresponding to the second search term is provided to the user.

The operations for obtaining the first search term input by the user may include the following operations.

A preferred recommendation selected by the user from search recommendations corresponding to the second search term is obtained. The preferred recommendation is used as the first search term input by the user.

Optionally, the importance degree characteristics of the candidate recommendations may be obtained based on related data before a preset time point.

Optionally, the importance degree characteristics of the candidate recommendations may be revised periodically for every preset cycle based on related data after the preset time point.

Optionally, the related data may include at least one of the following parameters: a TF-IDF value of a respective candidate recommendation, a number of times and/or frequencies that the respective candidate recommendation and the first search term are jointly searched, a number of times and/or frequencies that the respective candidate recommendation is correlated with the historical user behavior, a term attribute value of the respective candidate recommendation, and a label attribute value of the respective candidate recommendation.

Optionally, the historical user behavior relating to the keyword in the log record may be obtained by the following operations. Search terms used by one or more historical users in the log record are obtained. The search terms used by the historical users are clustered. A cluster corresponding to the keyword is determined. A user behavior relating to the search term included in the cluster corresponding to the keyword is determined according to the log record and such user behavior is determined as the historical user behavior relating to the keyword.

Optionally, a search recommendation corresponding to a keyword in the offline list may be a search recommendation after filtering through a synonym and/or a stop word.

Optionally, the text segmentation of the document may include a text segmentation of a title and/or attribute content of the document.

The present disclosure provides an example apparatus for providing search recommendation. The apparatus may include the following units.

A first search term obtaining unit obtains a first search term input by a user. A keyword matching unit matches the first search term with at least one keyword in a list such as an offline list to select at least one keyword from the offline list. Each keyword in the offline list corresponds to at least one search recommendation respectively.

A first recommendation providing unit obtains a search recommendation corresponding to the at least one keyword selected from the offline list and provides the search recommendation to the user as a search recommendation of the first search term.

A user behavior obtaining unit obtains a historical user behavior relating to the keyword from a log record. A document obtaining unit obtains a document generated by the historical user behavior. A text segmenting unit segments the document to obtain at least one candidate recommendation. A filtering unit filters the at least one candidate recommendations according to importance degree characteristics of the candidate recommendations and uses the candidate recommendations after filtering as the search recommendation corresponding to the keyword.

Optionally, the apparatus may further include a second search term obtaining unit and a second recommendation providing unit.

The second search term obtaining unit obtains a second search term input by the user. The second recommendation providing unit provides a search recommendation corresponding to the second search term to the user. The first search term obtaining unit obtains a preferred recommendation selected by the user from search recommendations corresponding to the second search term and uses the preferred recommendation as the first search term input by the user.

Optionally, the importance degree characteristics of the candidate recommendations may be obtained based on related data before a preset time point.

Optionally, the importance degree characteristics of the candidate recommendations may be periodically revised by the filtering unit for every preset cycle based on related data after the preset time point.

Optionally, the related data may include at least one of the following parameters: a TF-IDF value of a respective candidate recommendation, a number of times and/or frequencies that the respective candidate recommendation and the first search term are jointly searched, a number of times and/or frequencies that the respective candidate recommendation is correlated with the historical user behavior, a term attribute value of the respective candidate recommendation, and a label attribute value of the respective candidate recommendation.

Optionally, the user behavior obtaining unit may include the following sub-units. A search term obtaining sub-unit obtains search terms used by one or more historical users in the log record. A clustering sub-unit clusters the search terms used by the historical users. A cluster determining sub-unit determines a cluster corresponding to the keyword. A user behavior determining sub-unit determines a user behavior relating to the search term included in the cluster corresponding to the keyword according to the log record and determines such user behavior as the historical user behavior relating to the keyword.

Optionally, a search recommendation corresponding to a keyword in the offline list may be a search recommendation after filtering through a synonym and/or a stop word.

Optionally, the text segmentation of the document may conduct text segmentation of a title and/or attribute content of the document.

As shown from above, the present techniques do not necessarily provide a search recommendation from the search history of the current user. Instead, the present techniques match a first search term input by the user with an offline list to select at least one keyword from the offline list, and provide the user with a search recommendation corresponding to the keyword selected from the offline list. A search recommendation corresponding to each keyword in the offline list is obtained by performing text segmentation and importance filtering of terms from a document generated by historical user behavior relating to the keyword from a log record. Apparently, there is a broad selection range for search recommendations, thereby improving a probability that the search recommendations fit user requirements, reducing a number of user searches, and further reducing search time and search traffic. In addition, a search recommendation corresponding to each keyword in the offline list is calculated offline before the user inputs the first search term. Thus, the present techniques do not affect a speed of providing search recommendations to the user.

BRIEF DESCRIPTION OF THE DRAWINGS

To better illustrate the present techniques, the FIGs of the present disclosure are briefly described below. Apparently, the accompanying FIGs are only a portion of the embodiments of the present disclosure. One of ordinary skill in the art may obtain other figures based on the FIGs without using creative efforts.

DETAILED DESCRIPTION

In order to facilitate a user to perform a search conveniently and efficiently, a plurality of search recommendations relating to a search term may be automatically generated and provided to the user to select after the user inputs the search term. At present, a generation of a search recommendation is mainly based on a user search history. For example, if the user has searched terms such as "anti-haze mask price," "anti-haze mask model," etc, search recommendations such as "anti-haze mask price," "anti-haze mask model," etc. may be provided to the user to select at a search page by using a drop-down menu, etc. after the user inputs the search term "anti-haze mask."

However, such a method for providing search recommendations is based on a search history of the user, which not only has a narrow selection range of search recommendations but also limits the search recommendations to the user's subjective understanding of the search term. For example, if the user wants to search a specific term but the user cannot remember the exact term and only remembers a general meaning of the specific term, the user has to repeatedly input queries based on his/her own understanding until he/she finds the specific term, thereby consuming a lot of search time and search traffic.

The present disclosure provides example methods and apparatuses for providing search recommendation that increase the selection range of search recommendations, thereby reducing a number of user searches and further reducing search time and search traffic.

The technical solutions of the present disclosure are described by reference to the FIGs in the preset disclosure. Apparently, the described example embodiments are merely a portion of embodiments of the present disclosure instead of all embodiments of the present disclosure. Based on the example embodiments of the present disclosure, all other embodiments obtained by one of ordinary skill in the art without using creative efforts are within the scope of protection of the present disclosure.

The present disclosure is applicable at various universal or special computing device environment or configurations, such as personal computers, server computers, handheld devices or portable devices, tablet devices, multiprocessor devices, or any distributive computing environment including any one of the above devices or apparatuses.

The present disclosure may be described in the context of computer executable instruction executed by the computing device, such as program modules. Generally, the program modules include routines, procedures, objects, components, data structures that execute specific tasks or implement specific abstract data types. The present disclosure may also be applied in the distributive computing environment in which tasks are executed by remote processing devices connected through communications networks. In the distributive computing environment, program modules may be stored in local and remote computer storage media including storage devices.

Figure 1:
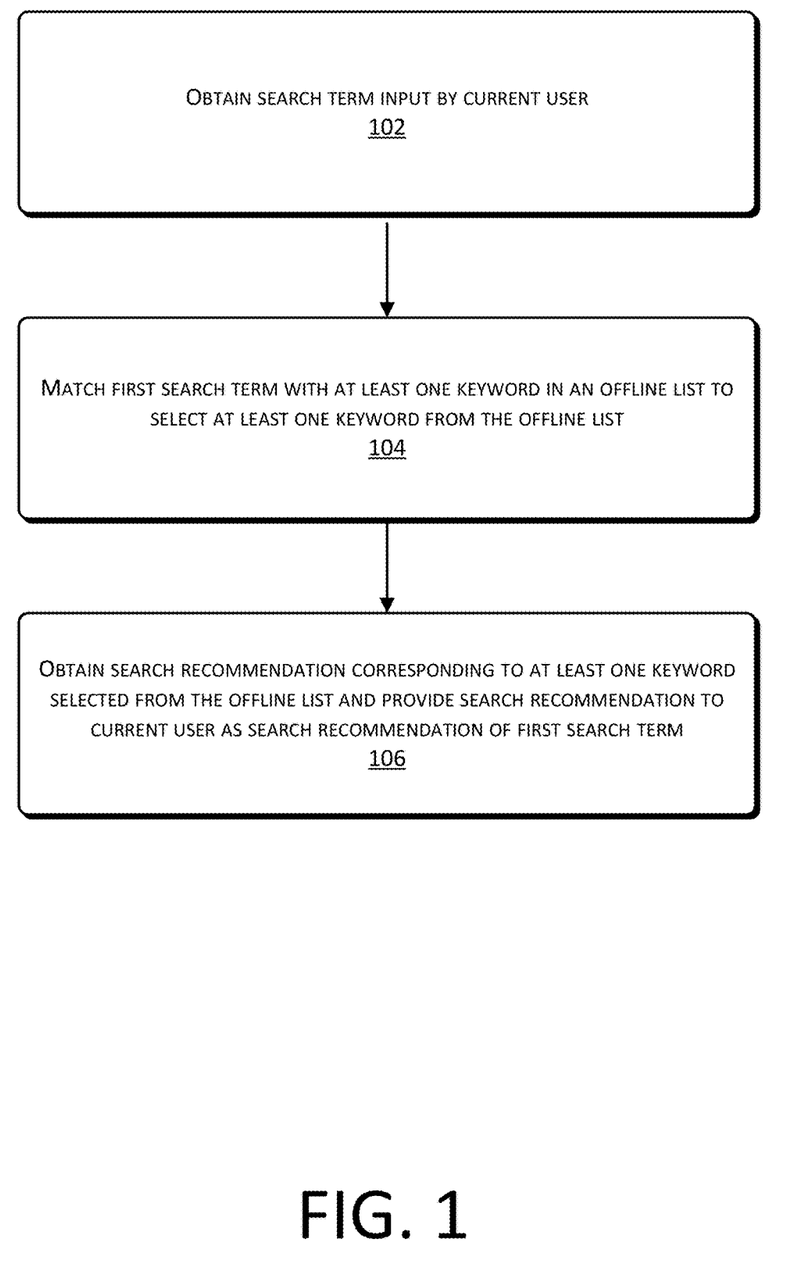
FIG. 1 is a flow chart illustrating an example method for providing a search recommendation according to a first example method embodiment of the present disclosure.

FIG. 1 is a flow chart illustrating an example method for providing a search recommendation according to a first example method embodiment of the present disclosure.

At 102, a first search term input by a current user is obtained.

When the user wants to search information, the user inputs one or more search terms to perform a search. Thus, the one or more search terms input by the user are obtained and used as a first search term. Certainly, the first search term may also be obtained by performing text segmentation of sentences or phrases input by the user.

The user may input the first search term by a variety of methods. For example, a search box is provided to the user, in which the user inputs the first search term via an input device such as a keyboard or an audio device. For another example, a select button, a drop-down menu, etc. may be provided to the user so that the user may select the first search term by single click, double click, hovering, etc.

At 104, the first search term is matched with at least one keyword in an offline list to select the at least one keyword from the offline list. Each keyword in the offline list corresponds to at least one search recommendation respectively.

For example, the offline list includes at least one keyword. The keywords may be high frequency words searched by one or more historical users. In addition, each keyword in the offshore list may correspond to at least one search recommendation. For example, the offline list may include a keyword "anti-haze mask", which corresponds to three search recommendations including "second-hand smoking prevention," "disease and germ prevention," and "flu." The offline list may be pre-stored at a search server. Therefore, the historical users of the present disclosure may include not only a current user but also a portion or all of users whose search history or information has stored at the search server.

At this step, the first search term is matched with at least one keyword in the offline list to select at least one keyword from the offline list. For example, one or more keywords having the highest matching degrees with the first search term may be selected from the offline list. For another example, a matching degree threshold may be set and one or more keywords whose matching degrees with the first search term are higher than the matching degree threshold may be selected from the offline list. For instance, if the first search term input by the user is "haze," as the term "anti-haze mask" in the offline list has the highest matching degree with "haze," "anti-haze mask" is selected as the keyword. The method for calculating the matching degrees may use the conventional techniques and is not detailed in the present disclosure.

At 106, a search recommendation corresponding to the at least one keyword selected from the offline list is obtained and provided to the current user as a search recommendation of the first search term.

In this example embodiment of the present disclosure, each keyword in the offline list may correspond to at least one search recommendation. For example, a keyword selected from the offline list is "anti-haze mask," and there are three search recommendations in the offline list corresponding to "anti-haze mask," i.e., "second-hand smoking prevention," "disease and germ prevention," and "flu." Therefore, any one or more search recommendations among the three search recommendations may be provided to the user.

For example, the search recommendations may be provided to the user by a drop-down menu, a sidebar, etc. The present disclosure does not impose any restriction.

It is noted that the method provided in the example embodiment of the present disclosure may be applied at a search server. For example, the executing entities of operations from 102 to 106 may be a search server. The search server may, according to the first search term input by the user, select a keyword and a search recommendation corresponding to the keyword from the offline list, and then provide the search recommendation to the user through a user terminal. For example, the search server in the present disclosure may be any type of server that is used by a search engine.

For example, the offline list includes at least one keyword, and each keyword in the offline list respectively corresponds to at least one search recommendation. The search recommendation corresponding to the keyword in the offline list may be obtained by the search server.

For example, the offline list may be generated offline. An example process for generating the offline list is provided below.

Figure 2:
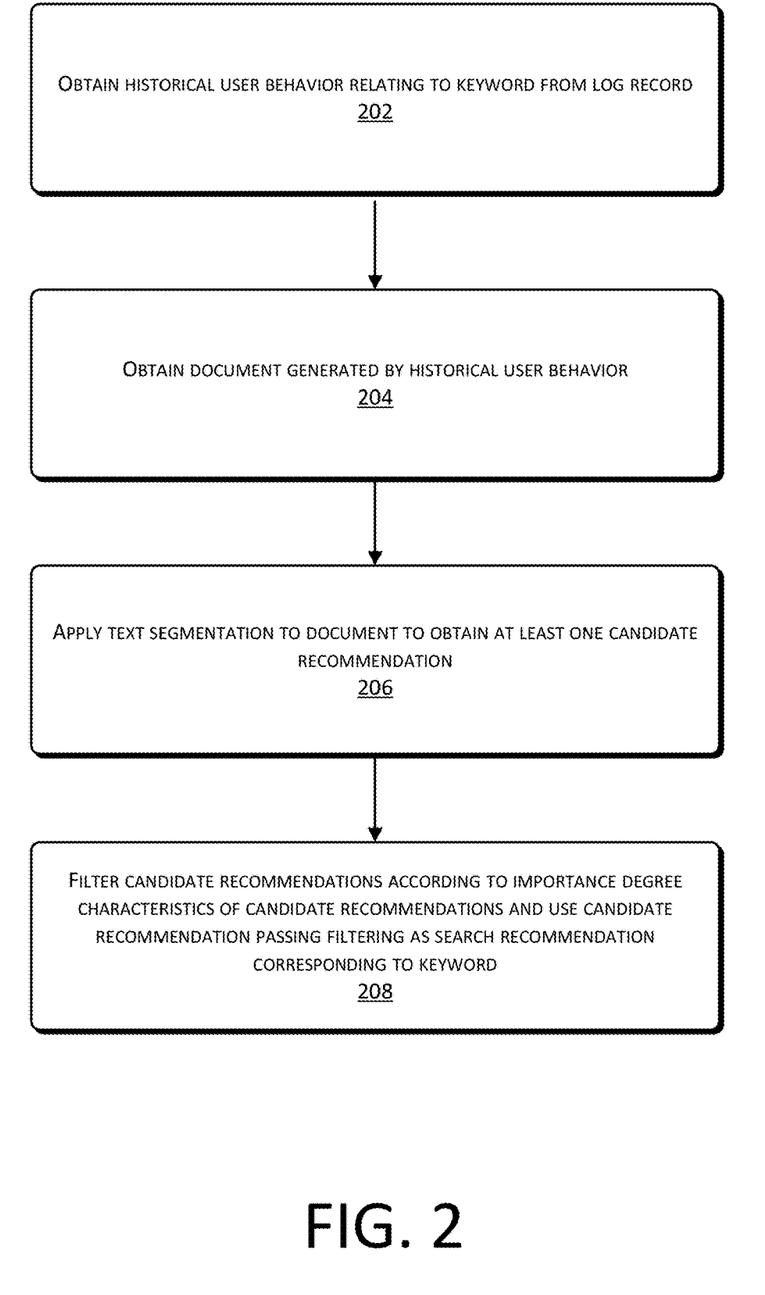
FIG. 2 is a flow chart illustrating an example process for obtaining a keyword according to the first example method embodiment of the present disclosure.

FIG. 2 is a flow chart illustrating an example process for obtaining a keyword according to the first example method embodiment of the present disclosure. As shown in FIG. 2, the method of obtaining a search recommendation corresponding to a keyword of the offline list may include operations from 202 to 208.

At 202, historical user behavior relating to the keyword is obtained from a log record.

In order to increase the base of statistical data, historical user behavior may include historical user behavior of all users recorded in the log record of the search server or historical user behaviors of users who have a same or similar attribute with the current user (such as users from same city, users from same gender).

Historical user behavior relating to the keyword may particularly include a click, collection, or copy of a link associated with the keyword or a purchase associated with the keyword.

It should be noted that when obtaining historical user behavior relating to the keyword at 202, a scope of obtaining may be enlarged to increase a range of selection for the search recommendations. Example sub-operations of 202 are as follows.

At a first operation, search terms used by one or more history users are obtained from the log record.

Keywords in the offline list may be selected from search terms used by the history user.

At a second operation, the search terms used by the history users are clustered. For example, the clustering of search terms may be based on a Probabilistic latent semantic analysis (PLSA) semantic clustering model.

At a third operation, a cluster corresponding to the keyword is determined.

Synonyms or similar terms of the keyword may be obtained by clustering search terms used by the history users at the first operation under 202.

At a fourth operation, one or more user behaviors relating to a search term included in the cluster corresponding to the keyword are determined according to the log record, and the related user behaviors are used as historical user behaviors relating to the keyword.

For example, operations at the fourth operation under 208 may include the following. Search term included in the cluster corresponding to the keyword is determined. User behaviors relating to the search term are determined included according to the log record.

For example, a keyword is "刘德华," which is the Chinese name of "Andy Lau." A synonym or similar word "Andy Lau" may be obtained after clustering of the keyword "刘德华." Therefore, at the time when the historical user behaviors are obtained, historical user behavior relating to "刘德华" and "Andy Lau" are obtained.

Thus, the synonym or similar term of the keyword may be acquired by clustering, then historical user behavior may be acquired based on the synonym or similar term acquired by clustering, thereby enlarging the range of selection for search recommendations, reducing the number of user searches, and further reducing the search time and search traffic.

At 204, a document generated by the historical user behavior is obtained.

The document generated by the historical user behavior is obtained after the historical user behavior relating to the keyword at 202 is obtained. In fact, each user behavior corresponds to a generated document. For example, a new link will be opened after a user clicks a link associated with the keyword, and information (such as texts, images and voices, etc.) relating to the new link may form a document. Information (such as images, voices, etc.) may be converted into corresponding text message by speech recognition and character recognition technologies.

At 206, text segmentation is applied to the document to obtain at least one candidate recommendation.

In order to reduce workload of text segmentation, for example, the text segmentation may be only applied to a title and/or attribute content of the document to obtain at least one candidate recommendation. The attribute content represents the attribute of the document. For example, if the document is a piece of an article, the attribute content may be an abstract or summary of the article. If the document is product information, the attribute content may be a product introduction.

Text segmentation of the document or the title and/or attribute content of the document may be based on existing text segmentation techniques based on dictionary or statistical methods such as text segmentation model (for instance, an ngram model).

At 208, the candidate recommendations are filtered according to importance degree characteristics of the candidate recommendations and the candidate recommendation passing the filtering are used as a search recommendation corresponding to the keyword.

For example, when filtering according to the importance degree characteristics, the present techniques may select one or more candidate recommendations with top highest importance degree characteristics, or set a feature threshold and select one or more candidate recommendations whose importance degree characteristics are greater than the feature threshold.

As the offline list may be generated before the user inputs the search term, a preset time point may be set. The importance degree characteristics of candidate recommendations may be obtained based on related data obtained before the preset time point. For example, the importance degree characteristics of the candidate recommendations are acquired based on related data obtained before the current day.

In order to ensure that the importance degree characteristics are real-time, the importance degree characteristics of the candidate recommendations in the present disclosure may also be revised periodically based on related data obtained after the preset time point for every preset cycle. For example, the importance degree characteristics of the candidate recommendations are preliminarily acquired based on related data obtained before the current day and then are periodically revised based on related data obtained on the current day for every preset cycle (such as two hours).

The important feature characteristic represents importance of the corresponding candidate recommendation. Related data based on which important feature characteristic is obtained may include at least one of following parameters: Term Frequency-Inverse Document Frequency (TF-IDF) value of the candidate recommendation, a number of joint search times and/or search frequency of the candidate recommendation and the first search term, a number of times or frequency that the candidate recommendation is related with the historical user behavior, a term attribute value of the candidate recommendation, and a label attribute value of the candidate recommendation.

Certain parameters mentioned above are respectively explained as below.

The TF-IDF value of the candidate recommendation: The TF-IDF value is calculated based on a TF-IDF algorithm to represent a characteristic value of the important feature. The TF-IDF algorithm is a statistical algorithm used for information retrieval and text mining so as to evaluate the importance of one term to a document from a set of files a language corpus. For example, the TF-IDF value of the candidate recommendation may be the TF-IDF value of the candidate recommendation in the document.

The number of joint search times and/or search frequency of the candidate recommendation and the first search term: a number of times and/or frequency that the candidate recommendation and the first search term simultaneously serve as search terms in a same search, which represents a co-occurrence rate of the candidate recommendation and the first search term.

The number of times or frequency that the candidate recommendation is related with the historical user behavior: a number of times and/or frequency of user behaviors that include a click, collection, copy of a link associated with the candidate recommendation or a purchase of an item associated with the candidate recommendation. For example, different weights may be set for different historical user behaviors. For instance, a lower weight is set for a click behavior and a higher weight is set for a purchase behavior.

The term attribute value of the candidate recommendation: the candidate recommendation is matched with a preset term table to determine a part of speech of the candidate recommendation (such as a noun, an adjective, etc.) and to determine whether the candidate recommendation belongs to a brand. Corresponding term attribute values of the candidate recommendations are set respectively.

The label attribute value of the candidate recommendation: the label attribute value is set based on the attribute of the candidate recommendation or manually labeled.

Different weights may be set for each of the above parameters at the time of calculating the importance degree characteristics.

In the example embodiments of the present disclosure, a search recommendation corresponding to a keyword in the offline list may be a search recommendation filtered by synonyms and/or stop words. For example, after operation at 206, the candidate recommendations acquired by text segmentation are filtered by synonyms and/or stop words. Alternatively, during operations at 208, the candidate recommendations are also filtered by the synonym and/or stop words.

It can be seen from the above technical solution that the example embodiments of the present disclosure do not provide a search recommendation from the search history of the current user. Instead, the present techniques match the first search term input by the current user with the offline list so as to select at least one keyword from the offline list, and provide the current user with a search recommendation corresponding to the keyword selected from the offline list. A search recommendation corresponding to each keyword in the offline list is obtained from a document generated by a historical user behavior relating to the keyword from a log record and after text segmentation and importance feature filtering. Apparently, the search recommendation provided by the present disclosure is not limited to the current user's search history, but is based on relevant historical user behavior. Therefore, the provided search recommendation has a wide range for selection. The present techniques improve the probability of the search recommendation that meets the user requirements, reduce the number of user searches, and further reduce the search time and search traffic. In addition, a search recommendation corresponding to each keyword in the offline list is calculated offline before the user inputs the first search term. Therefore the speed of providing search recommendations to the user is not affected.

It shall be noted that historical user behaviors relating to a plurality of users may be recorded in the log record in the example embodiments of the present disclosure. Therefore, the search recommendation provided by the example embodiments of the present disclosure is not limited to the subjective understanding of the current user for the search terms. For example, when the current user wants to search a special term, the current user may only input his/her understanding of this term, while other users may know the accurate expression of this term. Thus, based on historical user behavior of other users, the probability of providing the current user with the accurate expression of this term in the search recommendation may be increased, thereby reducing the number of times of repeated query by the current user.

In addition, the search recommendation in the example embodiment of the present disclosure is not limited to the search history of the current user (more particularly to high frequency words) any more, thereby ensuring that the generated search recommendation is not limited to fixed search terms. Thus, the present techniques scatter search traffic and reduce the Matthew Effect. Moreover, the search recommendation in the example embodiment of the present disclosure is obtained from the document generated by historical user behavior relating to the keyword and after text segmentation and importance degree filtering. Therefore, the provided search recommendation has a high correlation with historical user behavior and meets the user requirements, and is close to existing data in a data base. Thus, the searched contents are more abundant and concrete, thereby effectively reducing the number of searches of the current user.

The first search term input by the user is acquired at 102 in an example embodiment. In fact, the first search term may be a search term directly input by the current user. For example, the user may input "haze" by a keyboard or an audio device, and "haze" serves as the first search term. Additionally, the first search term may be one or more search recommendations generated based on the search term, which is illustrated by the following example embodiment.

Figure 3:
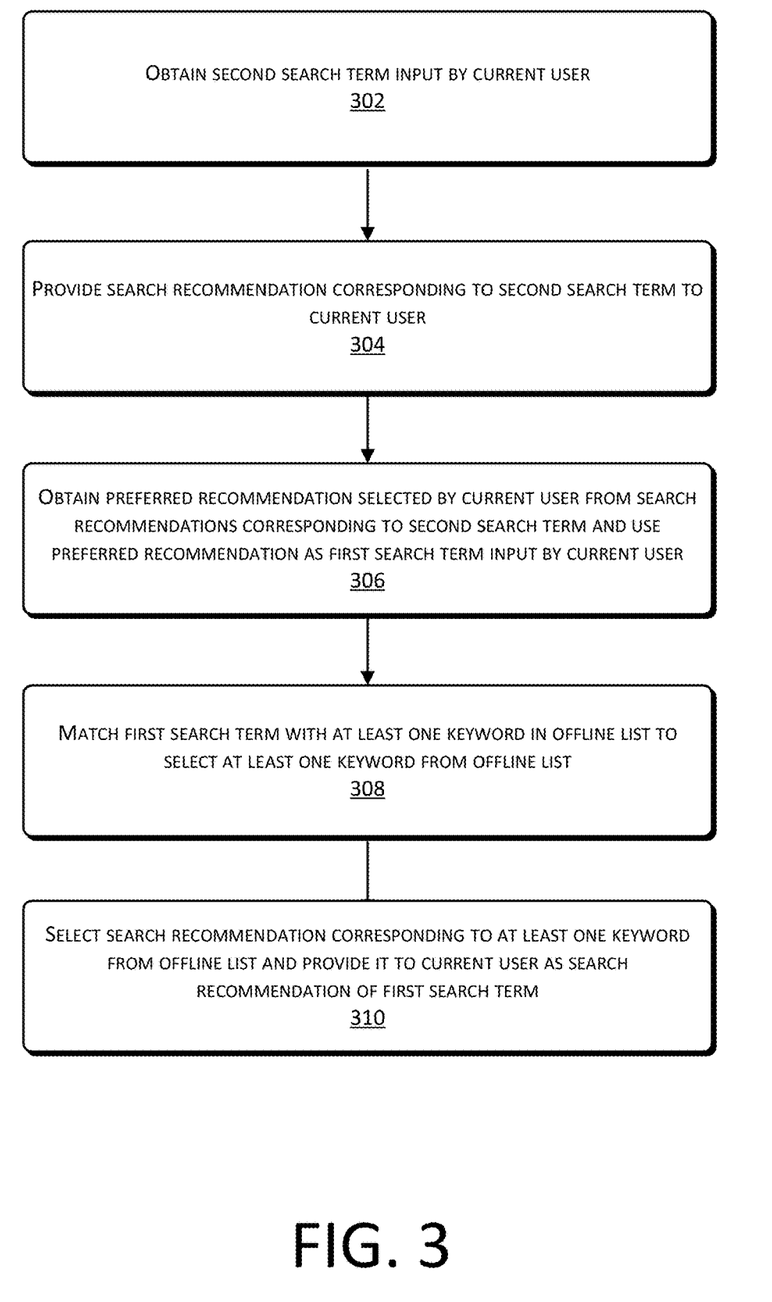
FIG. 3 is a flow chart illustrating another example method for providing a search recommendation according to a second example method embodiment of the present disclosure.

FIG. 3 is a flow chart illustrating another example method for providing a search recommendation according to a second example method embodiment of the present disclosure. Different from the first example embodiment, in the second example embodiment, the first search term is a search recommendation selected by the current user.

At 302, a second search term input by a current user is obtained.

The current user may input the second search term by a variety of ways. For example, the user is provided with a search box into which the user inputs the second search term by an input device such as a keyboard or an audio device. For another example, the user may be provided with a selection button, a drop-down menu, etc. so that the current user may select the second search term input by single click, double-click, hovering, etc.

It should be noted that the second search term may be either a search term directly input by the current user or a search recommendation generated based on the search term directly input by the user.

At 304, a search recommendation corresponding to the second search term is provided to the current user.

The particular method for providing the user with a search recommendation corresponding to the second search term is not limited. For example, after the current user inputs the second search term "haze," search recommendations (such as "anti-haze mask," "dedicated anti-haze mask," and "haze mask 3 mm," etc.) corresponding to the second search term may be provided to the user by operations at 104 and 106 in the first example embodiment. Of course, any existing method for providing the search recommendation may be adopted. For example, corresponding search recommendations are provided to the user based on a search history of the current user. The present disclosure does not detail herein.

The search recommendations corresponding to the second search term may be provided to the current user through a drop-down menu, a sidebar, etc., to which the present disclosure does not impose restriction.

At 306, a preferred recommendation selected by the current user from search recommendations corresponding to the second search term is obtained and the preferred recommendation is used as the first search term input by the current user.

Figure 4:
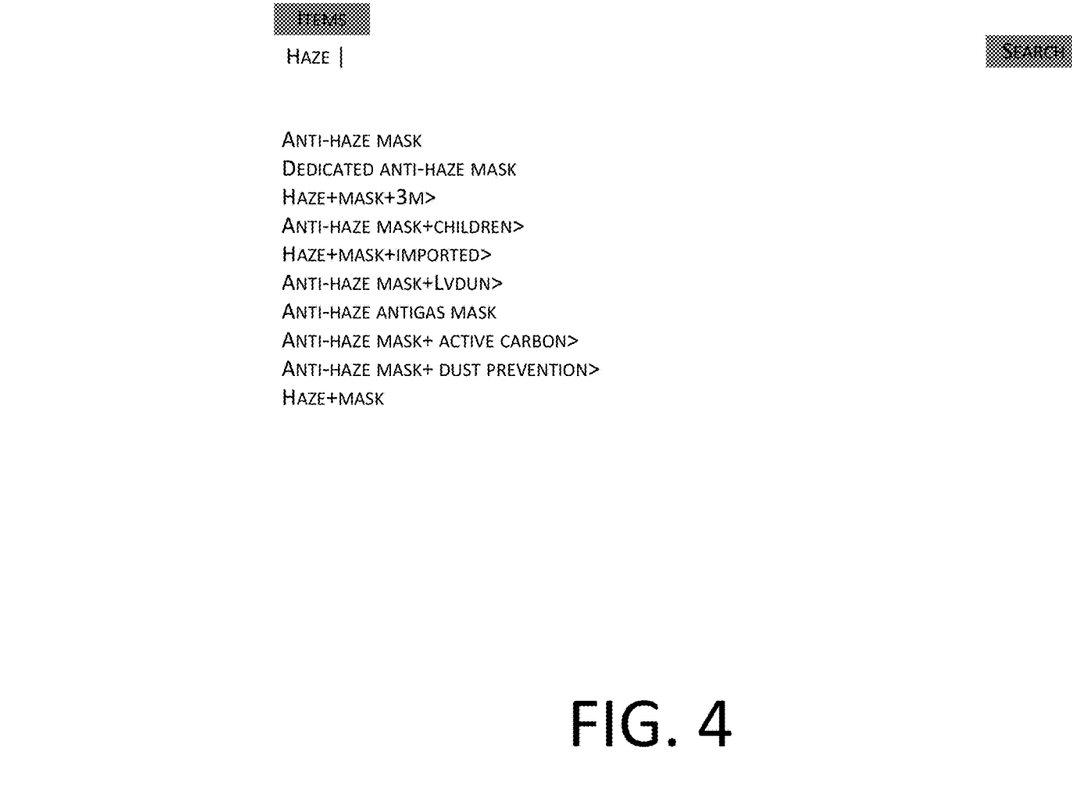
FIG. 4 is a diagram illustrating an example search recommendation that is provided to a user corresponding to a second search term.

After the search recommendations corresponding to the second search term are provided to the current user, the current user may select the first search term input by single click, double-click, hovering, etc. As shown in FIG. 4, after the user inputs the second search term "haze," the user is provided with search recommendations (such as "anti-haze mask," "dedicated anti-haze mask," "haze mask 3 mm," etc.) corresponding to the second search term by a drop-down menu. When it is detected that the user selects a search recommendation from the drop-down menu by hovering, etc., such as "anti-haze mask," the search recommendation is acquired and used as the first search term input by the user.

At 308, the first search term is matched with at least one keyword in an offline list to select at least one keyword from the offline list. Each keyword in the offline list respectively corresponds to at least one search recommendation.

For example, if the first search term "anti-haze mask" is acquired at 306, "anti-haze mask" is matched with a keyword in the offline list. For example, if a keyword "anti-haze mask" exists in the offline list, the keyword "anti-haze mask" is matched and acquired.

At 310, a search recommendation corresponding to at least one keyword is selected from the offline list and provided to the current user as a search recommendation of the first search term.

Each keyword in the offline list respectively corresponds to at least one search recommendation. For example, if the keyword "anti-haze mask" is selected at 308, search recommendations corresponding to "anti-haze mask" in the offline list are provided to the current user as search recommendations of the first search term "anti-haze mask."

It should be noted that operations at 308 and 310 are similar to those at 104 and 106 in the first example embodiment and thus are described briefly. The corresponding description of the first example embodiment may be referred to.

Figure 5:
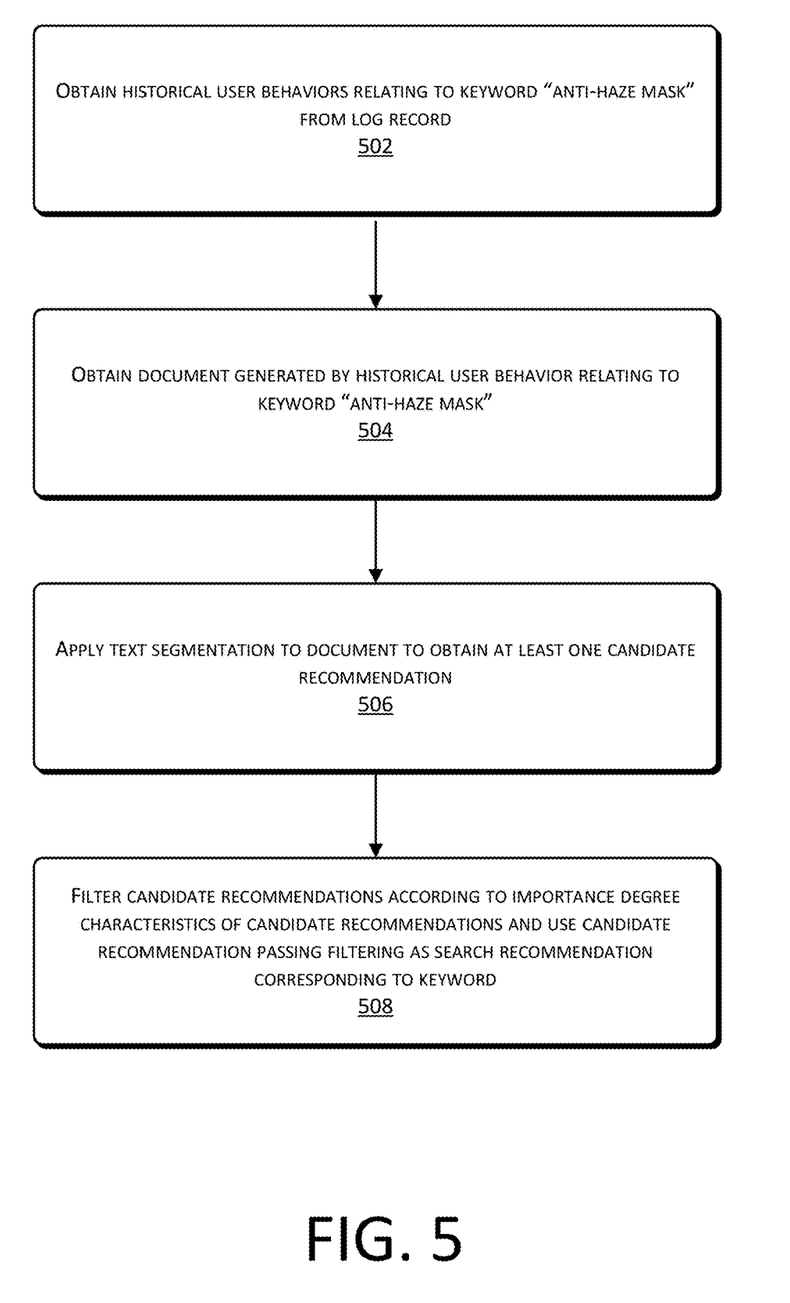
FIG. 5 is a flow chart illustrating an example process for obtaining a keyword according to a second example method embodiment of the present disclosure.

The search recommendations corresponding to each keyword in the offline list may be acquired by the search server. As shown in FIG. 5, by using the keyword "anti-haze mask" as an example, an example method for obtaining the corresponding search recommendations is described as follows.

At 502, a historical user behavior relating to the keyword "anti-haze mask" is obtained from a log record.

For example, historical user behaviors of all users related to the "anti-haze mask" such as click, collection, copy, or purchase through a link comprising "anti-haze mask" are obtained. Alternatively, not all of the users' historical user behaviors are obtained. For instance, historical user behavior of users with the same attribute as the user inputting the first search term "anti-haze mask" (such as users that are from a same city, users that are of a same gender) are obtained.

At 504, a document generated by the historical user behavior relating to the keyword "anti-haze mask" is obtained.

For example, after a user collects a link associated with "anti-haze mask," information (such as texts, images, audios, videos, etc.) relating to the link or directed by the link form a document.

At 506, text segmentation is applied to the document to obtain at least one candidate recommendation.

At 508, the candidate recommendations are filtered according to importance degree characteristics of the candidate recommendations and a candidate recommendation passing the filtering are used as a search recommendation corresponding to the keyword.

The importance degree characteristics of the candidate recommendations may be acquired according to related data obtained before the current date and revised based on related data obtained on the current date. For example, importance degree characteristics finally calculated may be a sum of importance degree characteristics calculated according to related data obtained on the current date and importance degree characteristics calculated according to related data obtained before the current date.

For example, the related data may be a sum of the following parameters: TF-IDF value of the candidate recommendation, a joint number of search times and/or search frequency of the candidate recommendation and the first search term, a number of times and/or frequency that the candidate recommendation is correlated with the historical user behavior, term attribute value of the candidate recommendation, and label attribute value of the candidate recommendation. Different weights may be set for each of the above parameters.

Figure 6:
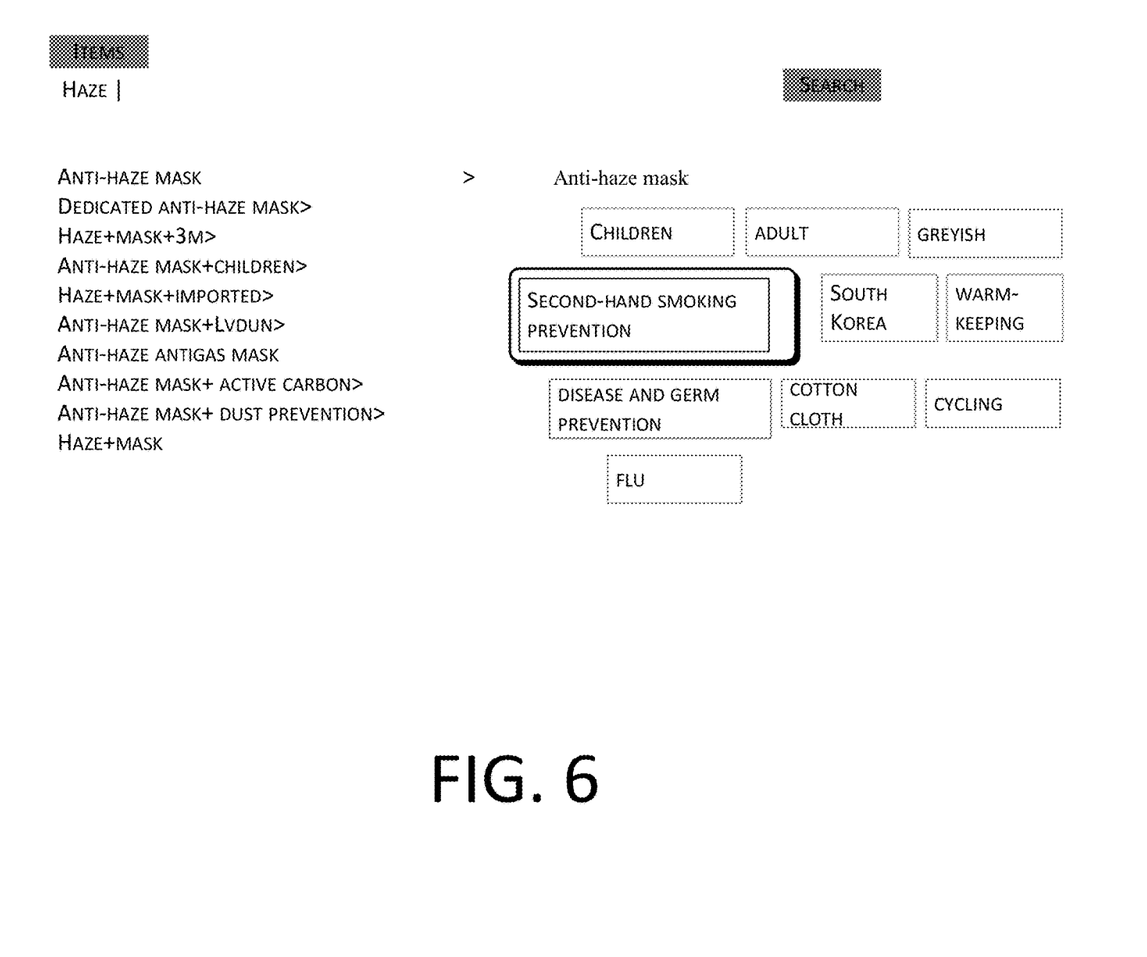
FIG. 6 is a diagram illustrating an example search recommendation that is provided to a user corresponding to a first search term.

After text segmentation at 506 and importance degree filtering at 508, search recommendations corresponding to "anti-haze mask" are obtained such as "second-hand smoking prevention," "disease and germ prevention," "flu," etc. As shown in FIG. 6, after the current user selects the first search term "anti-haze mask," search recommendations corresponding to "anti-haze mask" are provided to the user by a right sidebar, for example. The current user may further select a search recommendation to finish inputting a search term. For example, if the current user selects "second-hand smoking prevention," the search term finally input by the user is "anti-haze mask second-hand smoking prevention." The search server may search and provide corresponding search results based on the search term.

Figure 7:
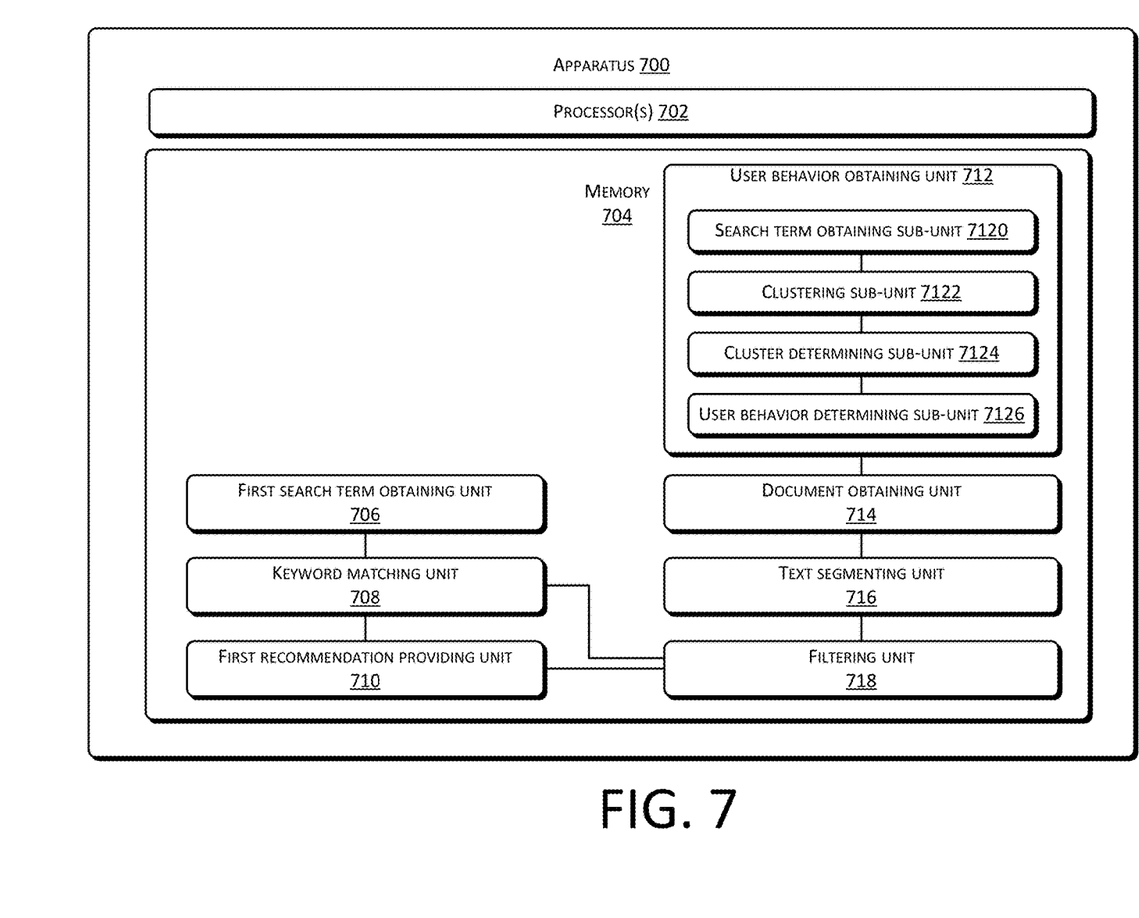
FIG. 7 is a diagram illustrating an example apparatus for providing a search recommendation according to a first example apparatus embodiment of the present disclosure.

Corresponding to the first example method embodiment for providing the search recommendation, FIG. 7 is a diagram illustrating an example apparatus 700 for providing the search recommendation according to a first example apparatus embodiment of the present disclosure. The apparatus 700 may include one or more processor(s) or data processing unit(s) 702 and memory 704. The memory 704 is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

The memory 704 may store therein a plurality of modules or units including a first search term obtaining unit 706, a keyword matching unit 708, a first recommendation providing unit 710, a user behavior obtaining unit 712, a document obtaining unit 714, a text segmenting unit 716, and a filtering unit 718.

The first search term obtaining unit 706 obtains a first search term input by a current user. The first search term includes one or more search words.

The keyword matching unit 708 matches the first search term with at least one keyword in an offline lists to select at least one keyword from the offline list. For example, the keyword matching unit 708 may use one or more keywords with the highest matching degree with the first search term from the offline list as the selected keywords, or set a matching degree threshold and use one or more keywords whose matching degree with the first search term is greater than the matching degree threshold as the selected keywords.

The offline list includes at least one keyword. The keywords may be high frequency words searched by historical users. Each keyword in the offline list respectively corresponds to at least one search recommendation. The offline list may be pre-stored at the apparatus 700 for providing search recommendation. The apparatus 700 for providing search recommendation may be set at a user terminal or a search server.

The first recommendation providing unit 710 obtains a search recommendation corresponding to the at least one keyword selected from the offline list and provides the search recommendation to the user as a search recommendation of the first search term. For example, the first recommendation provision unit 710 may provide the search recommendations to the user by a drop-down menu, a sidebar, etc.

The user behavior obtaining unit 712 obtains a historical user behavior relating to the keyword from a log record.

In order to increase the base of statistical data, historical user behaviors may be historical user behaviors of all users recorded in a log record of the search server or historical user behaviors of users with the same attribute as the current user inputting the first search term. The historical user behavior relating to the keyword may include, for example, behaviors such as click, collection, copy, or purchase through a link associated with the keyword.

In order to increase the selection range of search recommendations, the user behavior obtaining unit 712 may include a search term obtaining sub-unit 7120, a clustering sub-unit 7122, a cluster determining sub-unit 7124, and a user behavior determining sub-unit 7126.

The search term obtaining sub-unit 7120 obtains search terms used by a historical user in the log record. The keywords in the offline list may be selected from search terms used by historical users.

The clustering sub-unit 7122 clusters search terms used by the historical users. The clustering of the search terms may be based on a PLSA semantic clustering model.

The cluster determining sub-unit 7124 determines a cluster corresponding to the keyword. Synonyms or similar words of the keyword may be acquired by clustering search terms used by the historical users through the clustering sub-unit 7122.

The user behavior determining sub-unit 7126 determines user behavior relating to a search term included in the cluster corresponding to the keyword according to the log record and uses the related user behavior as the historical user behavior relating to the keyword.

The document obtaining unit 714 obtains a document generated by the historical user behavior.

The text segmenting unit 716 applies text segmentation to the document to obtain at least one candidate recommendation.

The text segmenting unit 716 may segment a title and/or an attribute content of the document. The attribute content represent an attribute of the document. For example, if the document is a piece of article, the attribute content may be an abstract or summary of the article. If the document is product information, the attribute content may be a product introduction.

The text segmentation unit 716 may apply text segmentation to the document or the title and/or attribute content of the document based on an existing text segmentation tool, a dictionary, or a statistical method based on text segmentation model (for example, an ngram model), etc.

The filtering unit 718 filters the candidate recommendations according to importance degree characteristics of the candidate recommendations and use the candidate recommendations passing the filtering as search recommendations corresponding to the keyword.

When filtering according to the importance degree characteristics, the filtering unit 714 may select one or more candidate recommendations with highest importance degree characteristics or set a feature threshold and select one or more candidate recommendations whose importance degree characteristics greater than the feature threshold.

The offline list may be generated before the user inputs the search term. Therefore, a preset time point may be set. When the filtering unit 718 obtains the importance degree characteristics of candidate recommendations, the filtering unit 718 may be based on related data before the preset time point. For example, the importance degree characteristics of the candidate recommendations are obtained by the filtering unit 718 based on related data before the current day. In order to ensure that the importance degree characteristics are real-time, the importance degree characteristics of the candidate recommendations may also be revised by the filtering unit 718 based on related data after the preset time point such that the importance degree characteristics are revised for every preset cycle.

The importance degree characteristics represent the importance of the candidate recommendations. The related data based on which the importance degree characteristics are acquired may include at least one of following parameters:

TF-IDF value of the candidate recommendation, a number of joint search times and/or search frequency of the candidate recommendation and the first search term, a number of times and/or frequency that the candidate recommendation is correlated with the historical user behavior, a term attribute value of the candidate recommendation, and a label attribute value of the candidate recommendation.

Different weights may be set for each of the above parameters to calculate the importance degree characteristics.

In the example embodiments of the present disclosure, a search recommendation corresponding to any keyword in the offline list may be filtered by a synonym and/or a stop word.

Figure 8:
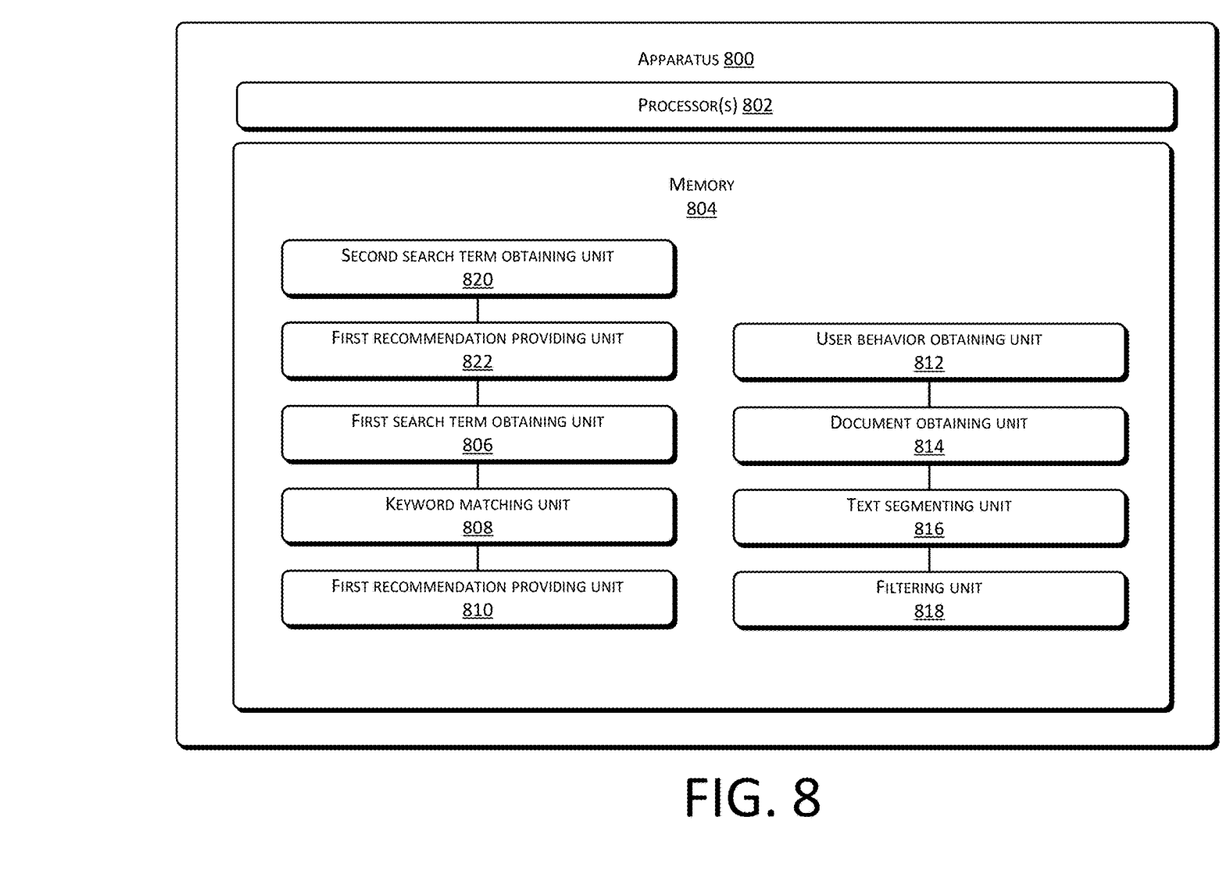
FIG. 8 is a diagram illustrating another example apparatus for providing a search recommendation according to a second example apparatus embodiment of the present disclosure.

Corresponding to the second example method embodiment for providing the search recommendation, FIG. 8 is a diagram illustrating an example apparatus 800 for providing the search recommendation according to a second example apparatus embodiment of the present disclosure. Different from the first example apparatus 700 for providing the search recommendation, in this example embodiment, the first search term is a search recommendation selected by the current user.

The apparatus 800 may include one or more processor(s) or data processing unit(s) 802 and memory 804. The memory 804 is an example of computer-readable media. The memory 804 may store therein a plurality of modules or units including a first search term obtaining unit 806, a keyword matching unit 808, a first recommendation providing unit 810, a user behavior obtaining unit 812, a document obtaining unit 814, a text segmenting unit 816, a filtering unit 818, a second search term obtaining unit 820, and a second recommendation providing unit 822.

The second search term obtaining unit 820 obtains a second search term input by the current user. It should be noted that the second search term may be either a search term directly input by the current user or a search recommendation generated based on the search term directly input by the current user.

The second recommendation providing unit 822 provide the user with a search recommendation corresponding to the second search term.

The particular method for providing the user with the search recommendation corresponding to the second search term is not limited. For example, after the user inputs the second search term "haze," search recommendations corresponding to the second search term are provided to the user through the keyword matching unit 808 and the first recommendation provision unit 810. Of course, any existing method for providing search recommendations may be adopted. For example, corresponding search recommendations are provided to the user based on search history of the current user. The present disclose does not detail herein.

The first search term obtaining unit 806 obtains a preferred recommendation selected by the current user from search recommendations corresponding to the second search term and uses the preferred recommendation as the first search term input by the current user.

After the search recommendations corresponding to the second search term are provided to the user, the user may select the first search term input by single click, double-click, hovering, etc.

The keyword matching unit 808 matches the first search term with at least one keyword from the offline list to select at least one keyword from the offline list. Each keyword in the offline list respectively corresponds to at least one search recommendation.

The first recommendation providing unit 810 obtains a search recommendation corresponding to at least one keyword selected from the offline list and provides it to the user as a search recommendation of the first search term.

The user behavior obtaining unit 812 obtains historical user behavior relating to a keyword in the offline list from a log record.

The document obtaining unit 814 obtains a document generated by the historical user behavior.

The text segmenting unit 816 applies text segmentation to the document to obtain at least one candidate recommendation.

The filtering unit 818 filters the candidate recommendations according to importance degree characteristics of the candidate recommendations and uses the candidate recommendations passing the filtering as search recommendations corresponding to the keyword.

The keyword matching unit 808, the first recommendation providing unit 810, the user behavior obtaining unit 812, the document obtaining unit 814, the text segmenting unit 816, and the filtering unit 818 are similar to corresponding contents in the third example embodiment or the first apparatus example embodiment as shown in FIG. 7 and thus are described briefly. The third example embodiment may be referred to for details.

It should be noted that the example embodiments of the present disclosure are described progressively. Each example embodiment focuses on differences from the other example embodiments. The same or similar parts among different example embodiments may be referred to each other. With respect to the example apparatus embodiments, as they are similar to the example method embodiments, they are described briefly and the relevant portions may refer to the corresponding parts at the example method embodiments.

In addition, it should be noted that relational terms such as "a first," "a second," etc. are merely intended to differentiate one entity or operation from another entity or operation, but are not intended to indicate or imply actual relation or sequence among these entities or operations. Furthermore, the term "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the elements.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but is not limited to, disk, CD-ROM, or optical storage device) that include computer-executable or computer-readable instructions.

The above description describes the example method and apparatuses for providing the search recommendation. The present disclosure uses specific example to illustrate the principle and implementations of the present disclosure. The above example embodiments are merely used for helping to understand the methods and concepts of the present disclosure. One of ordinary skill in the art may make any revisions or variations to the present techniques based on the principles of the present disclosure. Thus, the descriptions herein shall not be used as restriction to the present disclosure.

What is claimed is:

1. A method for providing a search recommendation, the method comprising:
   obtaining a first search term, the first search term input by a user;

matching the first search term with at least one keyword in a list to select the at least one keyword from the list, a respective keyword in the list corresponding to at least one search recommendation;
obtaining one or more search recommendations corresponding to the at least one keyword; and
obtaining the at least one search recommendation corresponding to the respective keyword, including:
  obtaining a historical user behavior relating to the respective keyword from a log record;
  obtaining a document generated by the historical user behavior;
  applying a text segmentation of the document to obtain one or more candidate recommendations;
  filtering the one or more candidate recommendations according to importance degree characteristics of the one or more candidate recommendations; and
  improving a probability that the at least one search recommendation fits user requirements and reducing a number of user searches, search time, and search traffic by using a candidate recommendation passing the filtering as a search recommendation corresponding to the respective keyword.

2. The method of claim 1, further comprising providing the one or more search recommendations to the user as one or more search recommendations of the first search term.

3. The method of claim 1, further comprising:
filtering the at least one search recommendation corresponding to the respective keyword by using one or more synonyms or stop words.

4. The method of claim 1, wherein the obtaining the historical user behavior relating to the respective keyword from the log record comprises:
  obtaining one or more search terms used by one or more historical users from the log record;
  clustering the one or more search terms used by the one or more historical users;
  determining a cluster corresponding to the respective keyword;
  determining a user behavior relating to a search term included in the cluster corresponding to the respective keyword according to the log record; and
  using the user behavior as the historical user behavior relating to the respective keyword.

5. The method of claim 1, wherein the applying the text segmentation of the document comprises applying the text segmentation of a title or an attribute content of the document.

6. The method of claim 1, further comprising:
obtaining the importance degree characteristics of the one or more candidate recommendations based on related data before a preset time point.

7. The method of claim 1, further comprising:
revising the importance degree characteristics of the one or more candidate recommendations based on the related data after the preset time point.

8. The method of claim 6, wherein the related data comprises at least one of:
  a TF-IDF value of a respective candidate recommendation;
  a number of joint search times or joint search frequency of the respective candidate recommendation and the first search term;
  a number of times or frequency that the respective candidate recommendation is correlated with the historical user behavior;
  a term attribute value of the respective candidate recommendation; and
  a label attribute value of the respective candidate recommendation.

9. An apparatus for providing a search recommendation, the apparatus comprising:
  a first search term obtaining unit that obtains a first search term, the first search term input by a user;
  a keyword matching unit that matches the first search term with at least one keyword in a list to select the at least one keyword from the list, a respective keyword in the list corresponding to at least one search recommendation;
  a first search recommendation providing unit that obtains one or more search recommendations corresponding to the at least one keyword and provides the one or more search recommendations corresponding to the at least one keyword to the user as one or more search recommendations of the first search term;
  a historical behavior obtaining unit that obtains a historical user behavior relating to the respective keyword from a log record;
  a document obtaining unit that obtaining a document generated by the historical user behavior;
  a text segmenting unit that applies a text segmentation of the document to obtain one or more candidate recommendations; and
  a filtering unit that filters the one or more candidate recommendations according to importance degree characteristics of the one or more candidate recommendations and improves a probability that the at least one search recommendation fits user requirements and reduces a number of user searches, search time, and search traffic by using a candidate recommendation passing the filtering as a search recommendation corresponding to the respective keyword.

10. The apparatus of claim 9, wherein the user behavior obtaining unit comprises:
  a search term obtaining sub-unit that obtains one or more search terms used by one or more historical users from the log record;
  a clustering sub-unit that clusters the one or more search terms used by the one or more historical users;
  a cluster determining sub-unit that determines a cluster corresponding to the respective keyword; and
  a user behavior determining unit that determines a user behavior relating to a search term included in the cluster corresponding to the respective keyword according to the log record and uses the user behavior as the historical user behavior relating to the respective keyword.

11. The apparatus of claim 9, wherein the filtering unit obtains the importance degree characteristics of the one or more candidate recommendations based on related data before a preset time point.

12. The apparatus of claim 11, wherein the filtering unit revises the importance degree characteristics of the one or more candidate recommendations based on the related data after the preset time point.

13. The apparatus of claim 11, wherein the related data comprises at least one of:
  a TF-IDF value of a respective candidate recommendation;
  a number of joint search times or joint search frequency of the respective candidate recommendation and the first search term;

a number of times or frequency that the respective candidate recommendation is correlated with the historical user behavior;
a term attribute value of the respective candidate recommendation; and
a label attribute value of the respective candidate recommendation.

14. The apparatus of claim 9, further comprising:
a second search term obtaining unit that obtains a second search term input by the user; and
a second recommendation providing unit that provides the user with one or more search recommendations corresponding to the second search term.

15. The apparatus of claim 14, wherein the first search term obtaining unit obtains a preferred recommendation selected by the user from the one or more search recommendations corresponding to the second search term and uses the preferred recommendation as the first search term input by the user.

16. The apparatus of claim 9, wherein the text segmenting unit applies the text segmentation of a title or an attribute content of the document.

17. One or more memories having stored thereon computer-executable instructions for providing a search recommendation, the computer-executable instructions executable by one or more processors to perform operations comprising:
obtaining a first search term, the first search term input by a user;
matching the first search term with at least one keyword in a list to select the at least one keyword from the list; a respective keyword in the list corresponding to at least one search recommendation;
obtaining one or more search recommendations corresponding to the at least one keyword; and
obtaining the at least one search recommendation corresponding to the respective keyword, including:
obtaining a historical user behavior relating to the respective keyword from a log record;
obtaining a document generated by the historical user behavior;
applying a text segmentation of the document to obtain one or more candidate recommendations;
filtering the one or more candidate recommendations according to importance degree characteristics of the one or more candidate recommendations; and
improving a probability that the at least one search recommendation fits user requirements and reducing a number of user searches, search time, and search traffic by using a candidate recommendation passing the filtering as a search recommendation corresponding to the respective keyword.

18. The one or more memories of claim 17, wherein the operations further comprise:
providing the one or more search recommendations to the user as one or more search recommendations of the first search term.

19. The one or more memories of claim 17, wherein the operations further comprise:
filtering the at least one search recommendation corresponding to the respective keyword by using one or more synonyms or stop words.

20. The one or more memories of claim 17, wherein the obtaining the historical user behavior relating to the respective keyword from the log record comprises:
obtaining one or more search terms used by one or more historical users from the log record;
clustering the one or more search terms used by the one or more historical users;
determining a cluster corresponding to the respective keyword;
determining a user behavior relating to a search term included in the cluster corresponding to the respective keyword according to the log record; and
using the user behavior as the historical user behavior relating to the respective keyword.

* * * * *